(12) United States Patent
Schmahl

(10) Patent No.: US 8,002,072 B2
(45) Date of Patent: Aug. 23, 2011

(54) FRONTAL STRUCTURE FOR A MOTOR VEHICLE

(75) Inventor: Heinrich Schmahl, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 436 days.

(21) Appl. No.: 12/112,536

(22) Filed: Apr. 30, 2008

(65) Prior Publication Data

US 2008/0272608 A1 Nov. 6, 2008

(30) Foreign Application Priority Data

May 4, 2007 (DE) .......................... 10 2007 020 914

(51) Int. Cl.
*B60K 11/04* (2006.01)
(52) U.S. Cl. ....... 180/274; 180/68.6; 280/784; 293/115; 293/117; 296/187.09
(58) Field of Classification Search .................. 280/784; 180/274, 68.4, 68.6; 293/115, 117, 193.1, 293/187.02, 203.02; 296/193.1, 187.09, 296/203.02; *B60K 11/04*
See application file for complete search history.

(56) References Cited

U.S. PATENT DOCUMENTS

| | | | | |
|---|---|---|---|---|
| 4,541,645 A | * | 9/1985 | Foeldesi ........................ | 180/68.4 |
| 5,403,048 A | * | 4/1995 | Ekladyous et al. ........... | 293/115 |
| 6,364,403 B1 | * | 4/2002 | Ozawa et al. ............. | 296/187.09 |
| 6,685,258 B2 | * | 2/2004 | Brogly et al. ............ | 296/203.02 |
| 7,044,246 B2 | * | 5/2006 | Fujieda ........................ | 180/68.4 |
| 7,246,674 B2 | * | 7/2007 | Andritter et al. ............. | 180/68.4 |
| 2001/0001994 A1 | * | 5/2001 | Enomoto et al. ............. | 180/68.4 |
| 2001/0010275 A1 | * | 8/2001 | Sasano et al. ................ | 180/68.1 |
| 2001/0027883 A1 | | 10/2001 | Sasano et al. | |
| 2004/0195020 A1 | * | 10/2004 | Suwa et al. .................. | 180/68.4 |
| 2004/0211607 A1 | * | 10/2004 | Sasano et al. ................ | 180/68.4 |
| 2005/0006913 A1 | * | 1/2005 | Otte .............................. | 293/115 |
| 2005/0218699 A1 | | 10/2005 | Andre et al. ............. | 296/193.09 |
| 2006/0081354 A1 | * | 4/2006 | Miura et al. ..................... | 165/41 |
| 2006/0207815 A1 | * | 9/2006 | Vandekerkhof .............. | 180/68.4 |
| 2008/0017429 A1 | * | 1/2008 | Palande et al. ............... | 180/68.4 |
| 2008/0308333 A1 | * | 12/2008 | Kapadia et al. .............. | 180/68.4 |
| 2009/0085373 A1 | * | 4/2009 | Terada et al. ............ | 296/187.09 |
| 2009/0184526 A1 | * | 7/2009 | Steller .......................... | 293/115 |
| 2009/0294098 A1 | | 12/2009 | Heine | |

FOREIGN PATENT DOCUMENTS

| | | | |
|---|---|---|---|
| DE | 10051567 A1 | | 4/2001 |
| DE | 10150643 A1 | * | 4/2003 |
| DE | 10260171 A1 | | 7/2004 |
| DE | 10337553 A1 | | 6/2005 |

(Continued)

*Primary Examiner* — Ruth Ilan
(74) *Attorney, Agent, or Firm* — Ingrassia Fisher & Lorenz, P.C.

(57) ABSTRACT

A frontal structure is provided for a motor vehicle. The frontal structure includes, but is not limited to a support structure, to which a radiator is fastened and on which a bumper girder is mounted in front of the radiator in such a manner that it yields backward toward the radiator in case of an impact. The fastening of the radiator to the support structure is formed by a frame, in which the radiator is retained and which is in turn anchored to the support structure via connection elements which detach if a maximum force is exceeded. The frame is adapted to the form of the bumper girder and the radiator to come into contact with the bumper girder earlier than the radiator in case of yielding backward of the bumper girder.

6 Claims, 2 Drawing Sheets

FOREIGN PATENT DOCUMENTS

| | | | |
|---|---|---|---|
| DE | 102005002068 A1 | 8/2006 |
| EP | 1232931 A1 | 8/2002 |
| EP | 1849641 A2 * | 10/2007 |
| FR | 2820710 A1 | 8/2002 |
| JP | 2002-286392 A * | 10/2002 |
| JP | 2002286392 A | 10/2002 |
| JP | 2005-35407 A * | 2/2005 |
| JP | 2006021700 A | 1/2006 |

* cited by examiner

FRONTAL STRUCTURE FOR A MOTOR VEHICLE

CROSS-REFERENCE TO RELATED APPLICATION

This application claims priority to German Patent Application No. 102007020914.4, filed May 4, 2007, which is incorporated herein by reference in its entirety.

TECHNICAL FIELD

The present invention relates to a frontal structure for a motor vehicle.

BACKGROUND

A frontal structure for a motor vehicle generally comprises a support structure, to which the radiator, engine, and other parts are fastened, as well as a bumper girder installed in front. The radiator is generally mounted in front of the engine block to be effectively cooled by travel wind. To make the vehicle as a whole is as compact as possible, an effort is made to make the distance between bumper girder and radiator, on one hand, and between radiator and engine block, on the other hand, as small as possible. However, the disadvantage results there from are that if the vehicle is involved in an impact, there is a high probability of damage to the radiator, so that costly repairs are necessary even in the event of a light impact.

In view of the foregoing, at least one object of the present invention is to specify a frontal structure for a motor vehicle, in which, in spite of a compact construction, the radiator is protected well from damage in the event of an impact. In addition, other objects, desirable features, and characteristics will become apparent from the subsequent summary, detailed description, and the appended claims, taken in conjunction with the accompanying drawings and this background.

SUMMARY

The at least one object and other objects, desirable features, and characteristics are achieved in that, in a frontal structure having a support structure, to which a radiator is fastened and a bumper girder is mounted in front of the radiator in such a manner that it yields backward toward the radiator in the event of an impact, the fastening of the radiator to the support structure is formed by a frame, in which the radiator is retained and which is in turn anchored on the support structure via connection elements which detach if a maximum force is exceeded, and the frame is adapted to the form of the bumper girder and the radiator to come into contact with the bumper earlier than the radiator if the bumper girder yields backward. The connection elements are detached in that the bumper girder yielding backward exerts force on the frame, and the frame may yield backward as a whole together with the radiator lying protected therein. A free space lying behind the radiator, which is not available for permanent placement of the radiator therein, may thus be made useful for protecting it, because the possibility exists that the engine or parts connected thereto will temporarily penetrate into this free space because of oscillations of the engine in relation to the support structure.

According to an embodiment, the connection elements are destructible by exceeding the maximum force. In particular, the connection elements may be implemented as pins which may be sheared off. However, the use of connection elements which yield elastically if the maximum force is exceeded, without thus being destroyed, is also conceivable.

To ensure that the frame is hit earlier by the bumper girder yielding backward than the radiator, the frame may be provided with vertical ribs projecting toward the bumper girder. In particular, these ribs may laterally border the radiator.

Furthermore, it is expedient if the frame is anchored on the support structure via a group of lower connection elements and a group of upper connection elements, and if the connection elements of one of the groups detach, the other group of connection elements defines an axis around which the radiator is pivotable. This allows in particular the usage of a free space whose depth is not constant over the vertical extension of the radiator.

A heat transfer line extends between the radiator and the support structure, preferably adjacent to the axis. The heat transfer line is thus essentially only subjected to a torsion load if the radiator yields backward, but not to a strong shear load, which could result in tearing of the line.

To fix the location of the pivot axis, one of the groups of connection elements is preferably designed to detach earlier than the other group under a force exerted by the bumper girder on the frame.

The depth of the free space behind the radiator is then expediently deeper at the height of the group of connection elements detaching earlier than at the height of the group detaching later.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
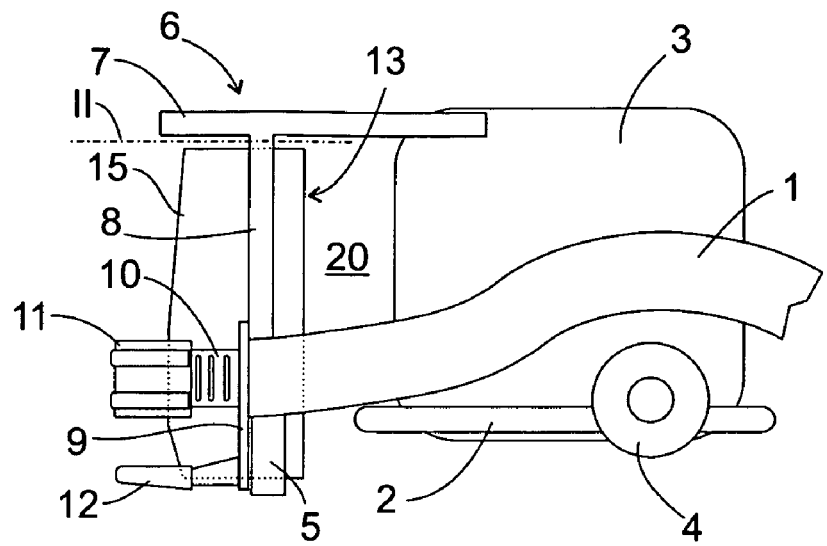
FIG. 1 shows a schematic side view of a frontal structure according to the invention.

FIG. 1 shows a schematic side view of a frontal structure according to the an embodiment for a motor vehicle. The chassis of the motor vehicle comprises two longitudinal girders 1 rigidly connected to one another, one of which is partially shown in FIG. 1. A front axle 2, which supports an engine 3 and a driveshaft 4 driven thereby, is mounted elastically on the longitudinal girders 1.

The front ends of the two longitudinal girders 1 are connected to one another by a traverse 5 running below the longitudinal girders and by a support part 6 extending above them. A transverse bow 7 of the support part 6, which is curved or C-shaped in a top view, is supported on the longitudinal girders 1 by vertical legs 8 and is used as a support for an engine hood (not shown in the figure).

The longitudinal girders 1 each terminate at a vertical plate 9, on which, approximately in horizontal extension of the longitudinal girders 1, a bumper cross member 11 is fastened via crash boxes 10. An auxiliary girder 12 mounted below the bumper cross member 11 on the plates 9 is used to support the bumper (not shown in the figure), which is mounted covering the bumper girder 11 and the auxiliary girder 12 at the lower leg height of a typical pedestrian.

A radiator frame 13 is attached between the two plates 9 within a curve circumscribed by the bumper cross member 11. The radiator frame 13 is an essentially rectangular structure, open at the front and rear, made of profile, in whose interior a radiator 14 (not visible in FIG. 1) is mounted (see FIG. 2, for example). The radiator 14 comprises, in a way known to those skilled in the art and therefore not shown in detail, one or more heat exchangers, one of which is connected via hose lines to the engine 3 to have coolant water of the engine flowing through it, as well as one or, if necessary, multiple fans.

Figure 2:
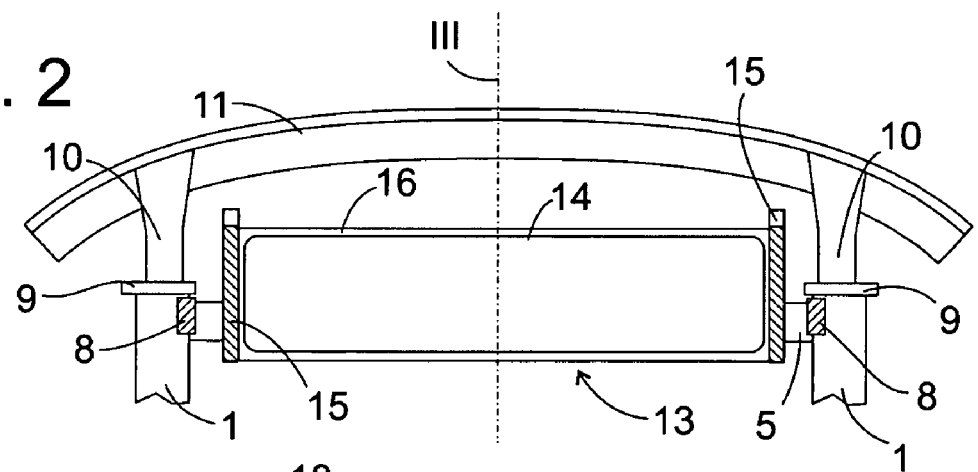
FIG. 2 shows a horizontal section through the frontal structure.

FIG. 2 shows a horizontal section through the frontal structure along the line identified by II in FIG. 1. It may be seen in this figure that the two lateral flanks 15 of the rectangular radiator frame 13 project significantly wider toward the bumper cross member 11 than the lower flank 16 of the frame 13 and the radiator 14 itself. It is thus ensured that even if, for example, an impact having partial overlap has the result that the bumper cross member 11 buckles centrally, the projecting edges of the lateral flanks 15 come into contact with the bumper cross member 11 yielding backward earlier than the radiator 14 and thus the radiator frame 13 is displaced to the rear together with the radiator 14.

Figure 3:
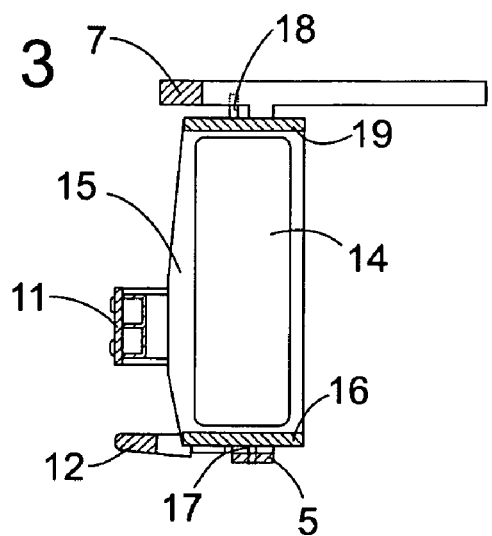
FIG. 3 shows a vertical section through the frontal structure.

FIG. 3 shows a vertical section through the frontal structure according to an embodiment in a section along the plane III from FIG. 2. Anchoring pins 17, 18 may be seen in this section, which each project in pairs from the lower flank 16 and/or the upper flank 19 of the frame 13 and engage in holes of the traverse 5 and/or the transverse bow 7. The anchoring pins 17, 18 may be plastic pins, for example, which are anchored in the aligned holes of the flanks 16, 19 and/or the traverse 5 and the support part 6 and whose material strength is selected in such a manner that they shear off if the bumper cross member 11 hits against the front edge of the flanks 15, without leaving damage on the radiator frame 13, the traverse 5, or the support part 6.

Depending on how the strength of the anchoring pins 17, 18 or other, similar connection elements between the radiator frame 13 and the support structure is dimensioned, different scenarios result if the radiator frame 13 is displaced by the bumper cross member 11 yielding backward. If both the upper and also the lower anchoring pins 18 and 17 are easily destructible, the moment of inertia of the radiator 14 and its frame 13 has the result that the pins 17, 18 are sheared off simultaneously and frame 13 and radiator 14 are displaced to the rear, toward the engine 3, while essentially maintaining their orientation in space. This may be an expedient solution if, as in the illustration of FIG. 1, the free space 20 present between radiator 14 and engine 3 has a depth remaining essentially uniform over the height of the radiator 14.

Figure 4:
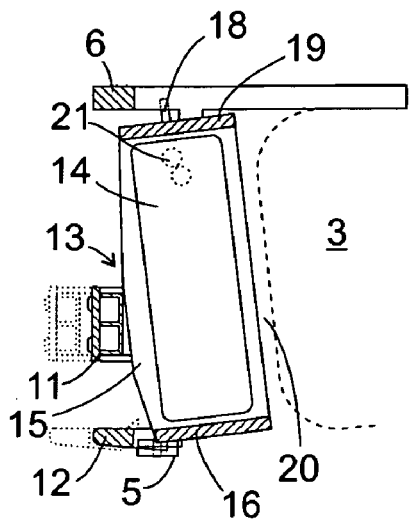
FIG. 4 shows a section analogous to FIG. 3 after an impact according to a first embodiment.

FIG. 4 shows a section analogous to FIG. 3 of another embodiment, in which the free space 20 has a depth increasing from top to bottom in the normal state before an impact. The bumper cross member 11 is displaced back by an impact from the position shown as a dashed outline into the position shown by solid lines with compression of the crash boxes 10 (not shown in the figure) and has sheared off the lower anchoring pins 17 at the same time. The radiator frame 13 is pivoted around an axis essentially defined by the engagement of the upper anchoring pins 18 in the support part 6. A hose connection, via which coolant water circulates between the radiator 14 and engine 3, as shown in the figure by dashed outlines 21, is led out on a lateral flank 15 of the frame 13 adjacent to the upper anchoring pins 17. Therefore, the danger that the coolant water line will be damaged by the yielding backward of the radiator 14 is very low. There is therefore quite a high probability that in the event of an impact which is not too strong, which has not resulted in a deformation of the longitudinal girder 1, the vehicle will still be capable of movement and may reach a service station under its own power, with a still functioning cooling system.

Figure 5:
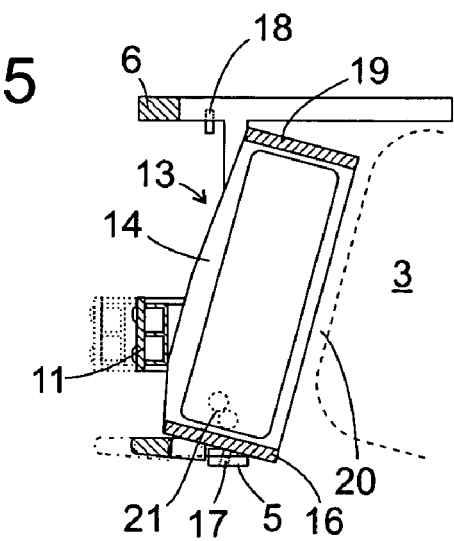
FIG. 5 shows a section analogous to FIG. 3 after an impact according to a second embodiment.

FIG. 5 shows the case opposite to FIG. 4, in which the depth of the free space 20 decreases from top to bottom. To use the free space 20 effectively, it is therefore necessary here for the upper anchoring pins 18 to be sheared off while the lower anchoring pins 17 remain intact. Because the height difference between the upper cross member 11 and the lower anchoring pins 17 is less than between the bumper cross member 11 and the upper anchoring pins 18, the lower anchoring pins 17 are subjected to a higher strain upon impact then the upper. Therefore, to implement the tilting of the radiator 14 around an axis defined by the lower anchoring pins 17 as shown in FIG. 5, they must have a significantly higher carrying capacity than the upper anchoring pins 18.

In this embodiment, the coolant water line 21 is led out of the radiator frame 13 adjacent to the lower flank 16 to minimize the danger the coolant water line 21 will be sheared off.

Figure 6:
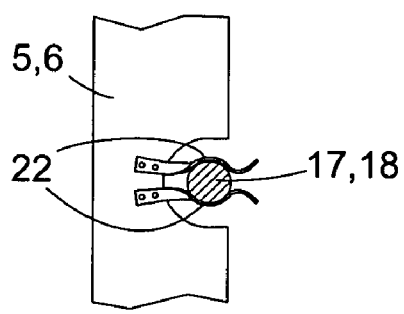
FIG. 6 shows a detail of a detachable connection between the frame of the radiator and the support structure.

While up to this point only the case of a connection of the radiator frame 13 to the support structure via pins which may be sheared off has been observed, there are, of course, numerous other possibilities for fastening the radiator frame 13 to the support structure in such a manner that it may yield to the pressure of the bumper cross member 11 yielding backward without receiving damage. FIG. 6 shows an example of a top view of a fraction of the traverse 5 or the support part 6 according to such an alternative having two leaf springs 22 fastened thereon, which hold one anchoring pin 17 or 18 of the radiator frame 13 between them. If the radiator frame 13 is subjected to a sufficient force, acting to the right in FIG. 6, the leaf springs 22 are driven apart and the anchoring pin 17, 18 comes free without being damaged. The possibility exists of fixing the radiator frame 14 again by simply pressing the anchoring pin 17 or 18 back between the leaf springs 22.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment or embodiment, it being understood that various changes may be made in the function and arrangement of elements described in an exemplary embodiment without departing from the scope of the invention as set forth in the appended claims and their legal equivalents.

What is claimed is:
1. A frontal structure for a motor vehicle, comprising:
a radiator;
a bumper girder;

a support structure, fastened to the radiator and on which the bumper girder is mounted in front of the radiator in such a manner that it yields backward toward the radiator in case of an impact;

a frame fastening the radiator to the support structure;

a plurality of connection elements retaining the radiator and anchored to the support structure which detach if a maximum force is exceeded, wherein the frame is adapted to the form of the bumper girder and the radiator to come into contact with the bumper girder earlier than the radiator in case of yielding backward of the bumper girder, wherein the plurality of connection elements anchoring the frame to the support structure comprise a plurality of lower connection elements and a plurality of upper connection elements, and in case of detachment of one of the plurality of lower connection elements and upper connections, the other one of the plurality of lower connection elements and upper connection elements defines an axis around which the radiator is pivotable; and wherein a heat transfer line extends adjacent to the axis between the radiator and the support structure.

2. The frontal structure according to claim 1, wherein the connection elements are pins which are destructible by exceeding the maximum force.

3. The frontal structure according to claim 1, wherein the frame comprises a plurality of vertical ribs projecting beyond a front side of the radiator toward the bumper girder.

4. The frontal structure according to claim 3, wherein the plurality of ribs laterally border the radiator.

5. The frontal structure according to claim 1, wherein one of the plurality of upper connection elements and lower connection elements is designed to detach earlier than the other one of the plurality of lower connection elements and upper connection elements under a force exerted on the frame by the bumper girder.

6. A frontal structure for a motor vehicle, comprising:

a radiator;

a bumper girder;

a support structure, fastened to the radiator and on which the bumper girder is mounted in front of the radiator in such a manner that it yields backward toward the radiator in case of an impact;

a frame fastening the radiator to the support structure;

a plurality of connection elements retaining the radiator and anchored to the support structure which detach if a maximum force is exceeded, wherein the frame is adapted to the form of the bumper girder and the radiator to come into contact with the bumper girder earlier than the radiator in case of yielding backward of the bumper girder, wherein the plurality of connection elements anchoring the frame to the support structure comprise a plurality of lower connection elements and a plurality of upper connection elements, and in case of detachment of one of the plurality of lower connection elements and upper connections, the other one of the plurality of lower connection elements and upper connection elements defines an axis around which the radiator is pivotable, wherein one of the plurality of upper connection elements and lower connection elements is designed to detach earlier than the other one of the plurality of lower connection elements and upper connection elements under a force exerted on the frame by the bumper girder; and wherein the depth of a free space behind the radiator is deeper at the height of the plurality of lower connection elements and upper connection elements detaching earlier than the height of the plurality of lower connection elements and upper connection elements detaching later.

* * * * *